Figures 4, 5:
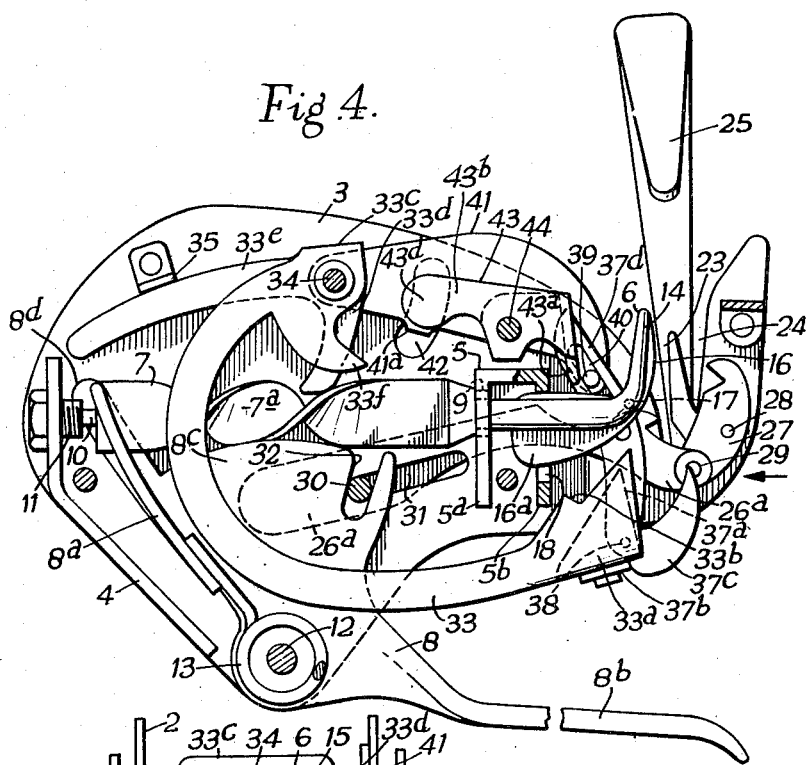

Jan. 28, 1958 C. R. SMITH 2,821,421
HAND OPERATED PORTABLE KNOT TYER
Filed Nov. 4, 1955 6 Sheets-Sheet 1
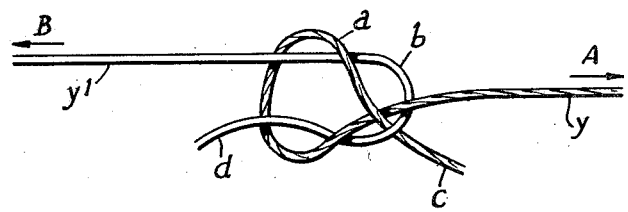
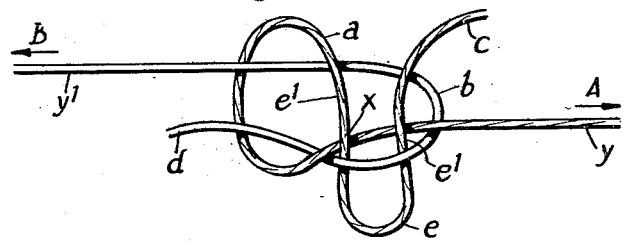
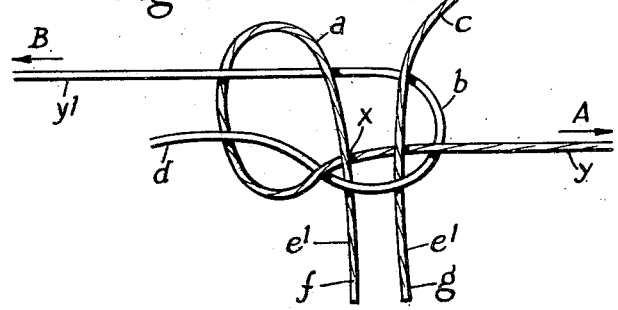
INVENTOR
BY
ATTORNEY Jan. 28, 1958     C. R. SMITH     2,821,421
HAND OPERATED PORTABLE KNOT TYER Filed Nov. 4, 1955     6 Sheets-Sheet 2

INVENTOR

BY

ATTORNEY

Jan. 28, 1958     C. R. SMITH     2,821,421
HAND OPERATED PORTABLE KNOT TYER

Filed Nov. 4, 1955     6 Sheets-Sheet 3

INVENTOR

BY

ATTORNEY

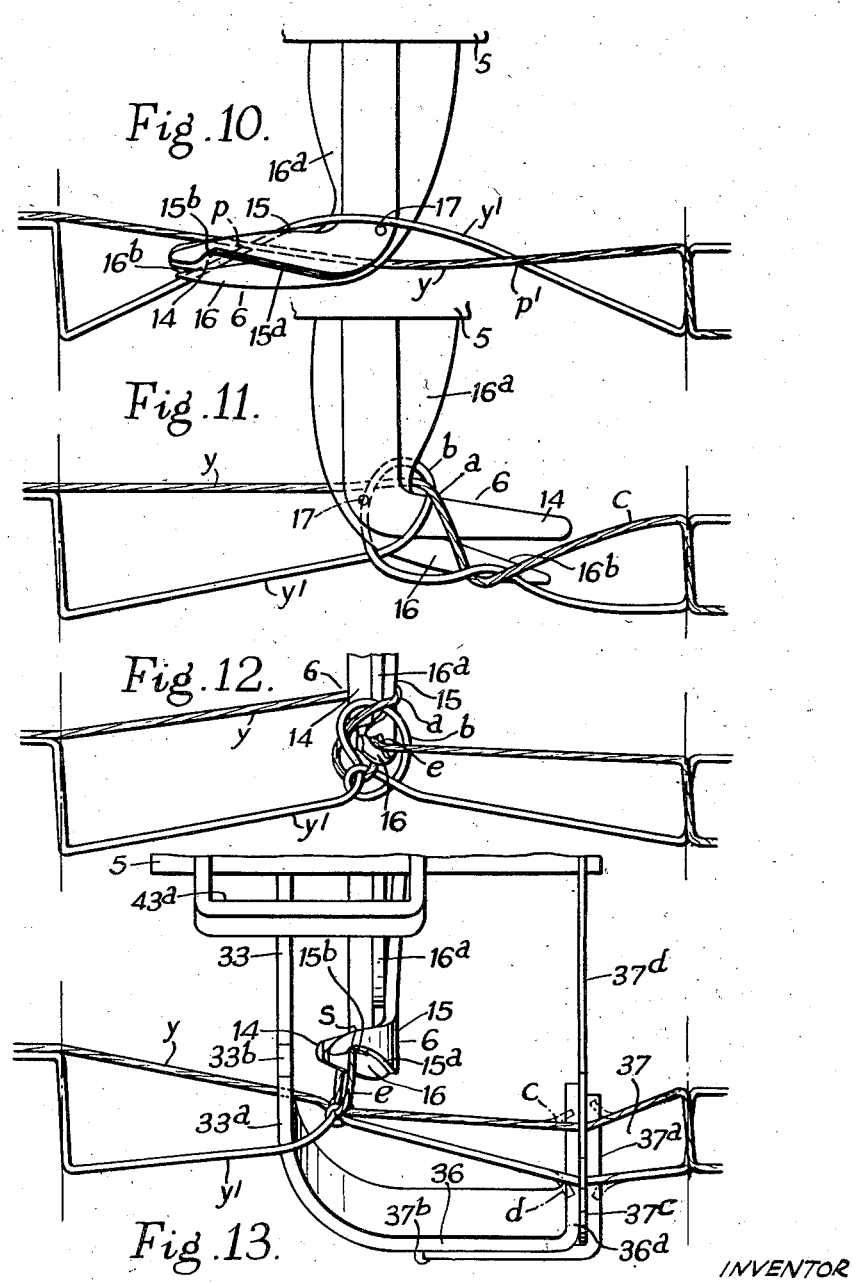

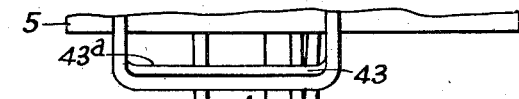
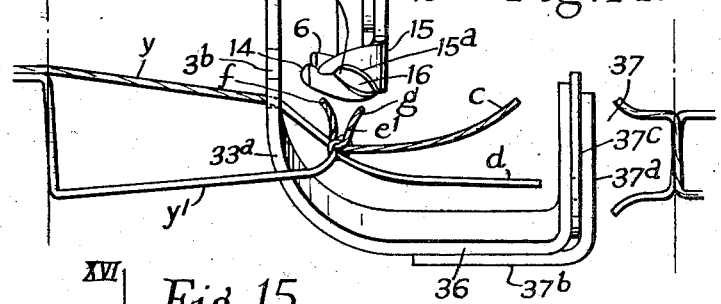
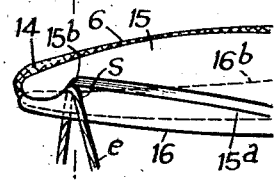
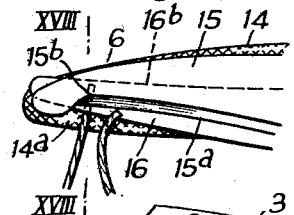
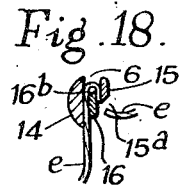
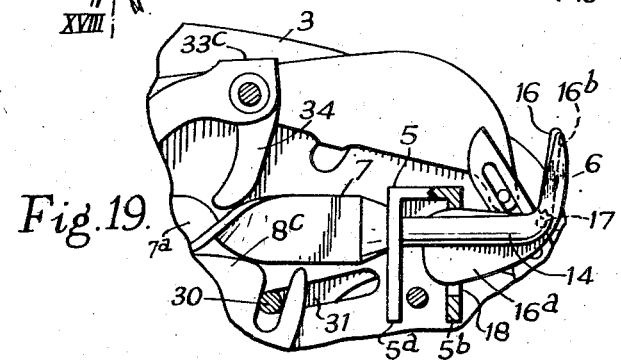

United States Patent Office 2,821,421
Patented Jan. 28, 1958

2,821,421

HAND OPERATED PORTABLE KNOT TYER

Charles Roland Smith, Fallowfield, Manchester, England, assignor to Mellor Bromley & Co. Limited, Leicester, England, a British company Application November 4, 1955, Serial No. 545,021

Claims priority, application Great Britain November 8, 1954

4 Claims. (Cl. 289—3)

This invention relates to weaver's knotters for forming weaver's knots.

By a "weaver's knot" is meant an interlacement of two textile yarns or threads or other filaments (hereinafter for convenience referred to simply as "yarns") resulting, when tightened, in a knob-like formation whereby the yarns are tied or fastened together with the yarn ends extending on opposite sides of the said formation.

A weaver's knot, moreover, serves to tie or fasten together ends of yarns being dealt with in textile machinery such, for instance, as spinning and winding machines, knitting machines, weaving looms and the like.

Now in a well known relatively flat form of a weaver's knot, as produced, for instance, on a conventional "Boyce" weaver's knotter, a closed loop formation of one yarn is interengaged with an open loop of the other yarn, and the extremity of each yarn extends outwardly through a loop of the other yarn, tightening of the knot being effected by pulling on the two yarns in respectively opposite directions. The present invention is concerned primarily with knots of this form.

In practice it is found that such a weaver's knot is not very secure in the case of springy, smooth and generally lively yarns, such as mohair, cross-bred, and worsteds. On the other hand, when once yarn ends have been tied together in a reasonably secure weaver's knot, this knot, when ultimately incorporated in a woven or knitted fabric is not easy to untie to enable the yarn ends to be woven or otherwise incorporated into the cloth or fabric during the appropriate finishing operation.

With the object of providing an improved form of weaver's knot which is generally more secure, but is easier to untie, than a conventional knot, I have proposed in my co-pending application Serial No. 545,094 that the end of one of the two yarns tied together, instead of consisting of a single strand passing straight through a loop or bight of the other yarn, shall comprise two side by side portions extending through the said loop or bight.

These side by side portions are disposed parallel or substantially so and are pressed together in, and help to fill, the tightened knot, thereby making for greater security.

In one form of the said improved knot the side by side portions of the relevant yarn are integrally joined and thus constitute the opposite limbs of an additional loop which is interengaged with the aforementioned loop or bight of the other yarn. In this case, the free extremity of the additional loop passes right through the said loop or bight of the other yarn, and the knot can be readily untied, to enable the yarn ends to be neatly incorporated into fabric during an appropriate finishing operation, by the simple expedient of pulling on the free extremity to withdraw the additional loop from the knot.

In another form of the knot, however, the additional loop is cut so that the two side by side portions of the end of the relevant yarn extending through the loop or bight of the other yarn are separated. Thus, in this second, and often preferred, form of the improved knot there are four instead of two free extremities, and the outermost one of the two side by side portions is short and unconnected with the yarn from which it is cut. However, the presence of the short, separate piece of yarn, wedged tightly in the loop or bight of the other yarn, is sufficient to prevent the knot from being accidently pulled inside out and untied. On the other hand, untying of such a knot, to enable the yarn ends to be neatly incorporated into fabric during a finishing operation, can, if required, be readily effected by first withdrawing the said short, separate piece of yarn. In any event, the merit of the particular form of knot just described is that it is safer against accidental untying by, for instance, a latch needle in a knitting machine than is the case where the additional loop is uncut.

Now in the specification of my co-pending application aforesaid I say that it is mainly the intention to use for producing the improved knot a "Boyce" weaver's knotter, suitably modified. A knotter of this type conventionally comprises, as well known to those acquainted with the art concerned, thread gripping and positioning means for crossing two initially parallel yarn ends at spaced points, a rotary tying bill for engaging the crossed yarns and forming a knot, a scissor device at one side of the knotter for cutting an appropriate one of the yarns, the other yarn being cut by the tying bill, and means for stripping the knot from the said bill. In a knotter of this type the tying bill customarily comprises a stationary tying blade, a pivoted cutting blade or shearing jaw and a third and resilient element co-operable with the latter. Heretofore, appropriate edges of the pivoted cutting blade and of the adjacent resilient element were sharpened so that whenever the bill was closed after being previously opened to receive the appropriate yarn, it functioned to trap and sever this yarn. That is to say, the said yarn was severed by the relatively moving sharpened edges of the bill to produce one of the free short extremities of the knot, and the yarn was trapped between the cutting blade and the stationary tying blade. The trapped extremity of this yarn remained in the bill during stripping of the knot from the latter as a consequence of which the knot was pulled "inside out" over the trapped extremity. It will accordingly be appreciated that when tying a knot with a conventional "Boyce" weaver's knotter, both of the yarn ends are cut (one in the side scissor device and the other in the tying bill) before stripping of the knot from the bill. The result of cutting the ends is to produce two short free extremities on respectively opposite sides of the knot.

The primary object of the present invention is to provide, in a "Boyce" weaver's knotter, simple modifications designed to enable knots of the hereinbefore described improved form to be readily produced.

Thus to enable a conventional "Boyce" weaver's knotter to produce a knot of the improved form, the elements of the tying bill are so formed as to be adapted to engage the end of the relevant yarn and draw it into an additional loop, and the knotter is provided with a scissor device arranged and operable to cut both of the yarns after the formed knot has been stripped from the bill.

Thus, in the modified knotter, the rotating bill, in addition to effecting interengagement of a closed loop formation of one yarn with an open loop or bight of the other yarn, draws a further loop of the first mentioned yarn through the said open loop or bight and holds this additional loop until after the knot has been stripped from the bill and tightened. The bill, when and as a consequence of being closed upon the engaged yarn to draw and retain the additional loop does not function to cut that yarn; hence, the tying bill in the modified knotter is not responsible for producing one of the short free extremities of yarn at opposite sides of the knot.

If, as previously explained herein, the additional loop in the knot is to remain unsevered, the sharpened cutting edges on the bill are eliminated altogether.

In the more likely event, however, that the additional loop is to be cut as and for the hereinbefore mentioned purpose, the pivoted blade or jaw and an adjacent relatively fixed element of the tying bill are formed with sharpened cutting edges, but in this case the sharpened edges are so disposed and the relatively stationary element is so shaped that the bill will avoid severing the engaged yarn when the pivoted blade or jaw is moved to draw and retain the additional loop. Ultimate severance of the yarn to cut the loop is delayed until after the knot has been stripped and tightened and the two yarn ends have been cut in the common scissor device, such severance then being effected by an additional movement imparted to the pivoted blade or jaw.

The delayed final phase of closing movement of the said pivoted blade or jaw may advantageously be imparted thereto by a fulcrumed member which is arranged for action upon the edge of the blade or jaw and is adapted to be actuated by a part of or associated with the knot stripper.

The common scissor device for cutting both of the yarn ends may conveniently be mounted upon the stripper. It would, however, alternatively be possible to cut both of the yarns in a suitably extended side scissor device separate from the stripper.

Figure 6:
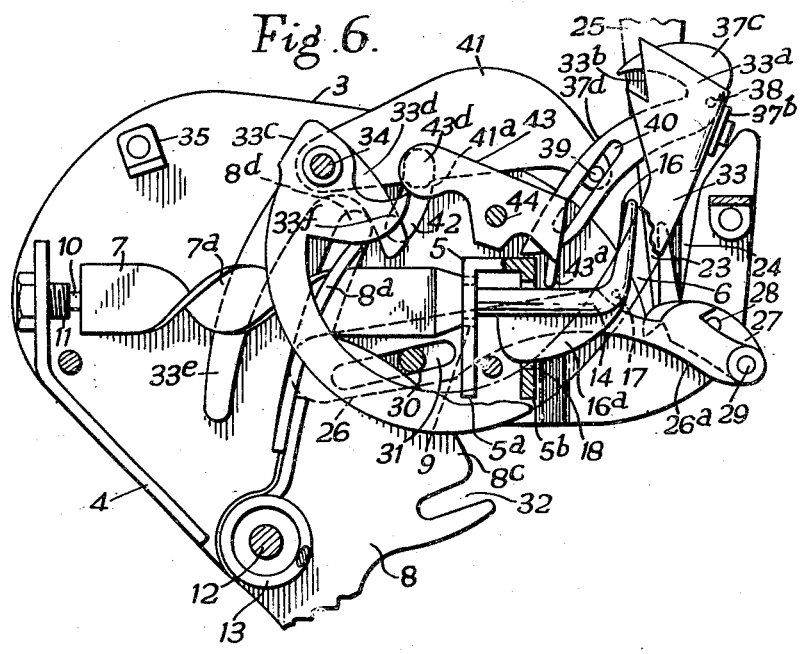
Figure 7:
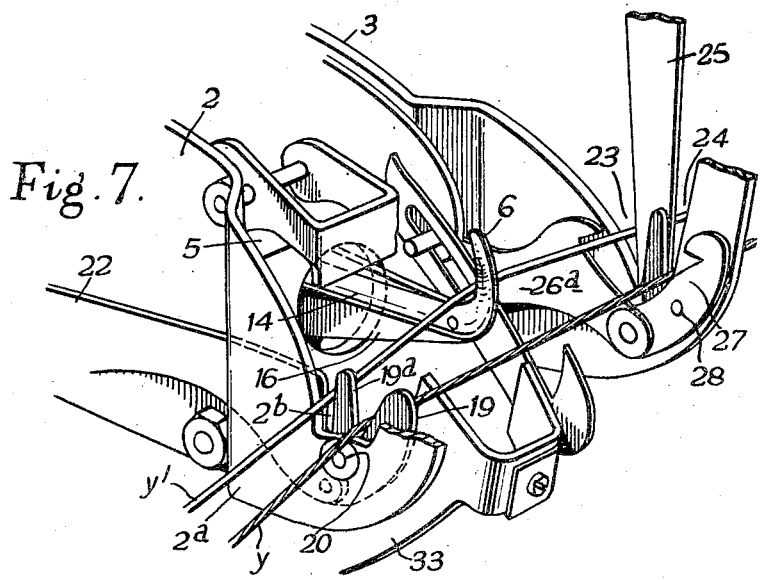
Figure 8:
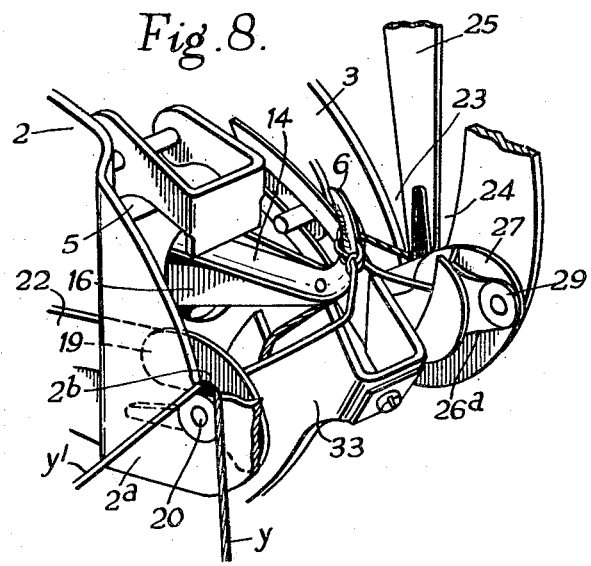

In order that the invention may be more clearly understood and readily carried into practical effect, specific examples of the improved weaver's knot, and a modified "Boyce" weaver's knotter suitable for producing the same will now be described with reference to the accompanying drawings, wherein, Figure 1 is a diagrammatic representation, for purposes of comparison, of a standard weaver's knot of the form concerned, Figure 2 is a similar representation of such knot modified in accordance with this invention and with the additional loop uncut, Figure 3 is an alternative (and often preferred) version of the improved knot showing the additional loop cut to render the knot safer against accidental untying, Figure 4 is a side elevational view, partly in section, of a "Boyce" weaver's knotter modified in accordance with this invention to produce the knot depicted in Figure 3, the knotter being shown in its inoperative condition and with one of its side plates removed, Figure 5 is a front view of the modified knotter as seen in the direction of the arrow in Figure 4, Figure 6 is a further side view of the knotter, this time shown in its fully operated condition and with the same side plate removed, Figure 7 is an enlarged detail perspective view of the frontal portion of the knotter in its inoperative condition, and shows the two yarns to be tied together as they appear when initially laid across the knotter, Figure 8 is a similar perspective view of the same portion of the knotter but this time in its fully operated condition, Figures 9-14 comprise a series of enlarged detail views of the tying head of the knotter illustrating successive stages in the formation of a knot like that shown in Figure 3, Figure 15 is a detail side view of the tying bill, corresponding to the stage illustrated in Figure 13 and showing the pivoted blade or jaw positioned to draw and retain the additional loop, Figure 16 is a detail cross-sectional view taken on the line XVI—XVI of Figure 15, Figure 17 is another detail side view of the tying bill, this time corresponding to the stage illustrated in Figure 14 and showing the pivoted blade or jaw moved to a further extent to cut the additional loop, Figure 18 is a detail cross-sectional view taken on the line XVIII—XVIII of Figure 17, and Figure 19 is a fragmentary side view of the mechanism of a modified form of the improved knotter designed to draw and retain an additional loop without cutting it.

Like parts are designated by similar reference characters throughout the drawings.

Referring to Figure 1 it will be seen that the standard relatively flat weaver's knot depicted therein is produced by tying together two yarns $y$ and $y'$ which, for convenience in illustration, are respectively shaded and unshaded. The knot comprises a closed loop $a$ formed by a crossing of the shaded yarn $y$ at $x$, which loop is interengaged with an open loop or bight $b$ of the unshaded yarn $y'$. A short extremity consisting of a single strand, of the yarn $y$ extends outwardly through the loop or bight $b$, whilst a similarly short extremity $d$ of the yarn $y$ extends outwardly through the loop $a$. The two extremities $c$ and $d$ accordingly protrude from respectively opposite sides of the knot, and the latter is tightened by pulling on the yarns $y$ and $y'$ in the opposite directions indicated by the arrows A and B.

The form of the improved knot illustrated in Figure 2 is in many respects similar to the standard knot just described with reference to Figure 1, although, in the interests of greater security, it is modified by the provision therein of an additional loop $e$ of the yarn $y$ which is drawn through the open loop or bight $b$. As before, the extremity $c$ of the yarn $y$ extends outwardly through the loop or bight $b$, and the modified knot is tightened in the usual way by pulling on the yarns $y$ and $y'$ in the opposite directions A and B respectively. Thus, instead of a short single strand of the yarn $y$ projecting through the loop or bight $b$ as in the standard knot depicted in Figure 1, two side by side portions $e'$ of the said yarn, constituted by the limbs of the additional loop $e$, extend through the loop or bight to provide the greater security. For the sake of clarity in Figure 2, the modified knot is shown purely diagrammatically and in an opened-out condition; in practice, however, tightening of the knot results in the interengaged loops $a$, $b$ and $e$ being drawn together so that the connected side by side portions $e'$ lie wedged together tightly within the loop or bight $b$— with the rounded connecting portion of the loop $e$ protruding from the knot. The right-hand one of the straight side by side portions $e'$ prevents the knot, in the ordinary way, from being pulled inside out and untied. But by pulling the free extremity $c$ of the shaded yarn $y$, the additional loop $e$ can be readily withdrawn from the knot to untie the same for the purpose hereinbefore explained.

But since, especially in a case where the joined yarns are to be incorporated into knitted fabric on a knitting machine, the presence of the protruding portion of the additional loop $e$ could result in the knot becoming accidentally untied (e. g. as a consequence of the loop $e$ being caught by a needle of the knitting machine), it will usually be preferred to cut through the said loop after tightening of the knot. As illustrated in Figure 3, the cutting of the additional loop separates the side by side portions $e'$ and results in the production adjacent to the knot of two further free extremities of yarn $f$ and $g$ which are innocuous so far as accidental untying of the knot is concerned. The right-hand portion $e'$, although in this case only short and separated from the yarn $y$, nevertheless is still enabled to function in the same manner as the corresponding portion in the previously described example; that is to say, being wedged tightly in the loop or bight $b$ of the yarn $y'$ it acts to prevent the knot from being pulled inside out and untied when subject to strain lengthwise of the joined yarns.

It is to be clearly understood that the improved knots just described do not constitute the present invention, since they are covered in the specification of the copending application. The forms of the knots are, however, set out to facilitate an understanding of the knotter now to be described and which does form the subject of the invention.

Referring to Figures 4, 5 and 6 it will be seen that the framework of the knotter comprises two side plates 2 and 3 which are spaced apart parallel to each other primarily by means of a suitably contoured cross plate 4 and a transverse bridge 5 of inverted channel section. The rotary tying bill, indicated generally at 6, is rigidly mounted upon the leading end of a rotatable carrier member 7. The main portion of this member is fashioned from an initially flat bar which is so twisted as to produce therein a co-axial helical formation 7a adapted for co-operation with one limb 8a of a forked rear portion of the conventional actuating member 8 of the knotter. At its leading end, the carrier member 7 is combined with a co-axial cylindrical component 9 in which appropriate elements of the tying bill are set, this component being journalled to rotate in a bearing hole formed in the rear wall 5a of the aforementioned transverse bridge 5. The tail end of the spirally twisted member 7, on the other hand, is fitted with a pintle 10 arranged to turn within a bearing 11 screwed into a rear, upwardly directed portion of the cross plate 4. The actuating member 8, formed with the customary thumbpiece 8b is mounted to turn about a transverse fulcrum pin 12 mounted in the side plates 2 and 3. A torsion spring 13 (Figure 5) controls the actuating member 8, this spring being so arranged that the thumb-piece 8b is depressed, as depicted in Figure 6, against the spring action, and the member 8 is restored to its normal inoperative position shown in Figure 4 under the said action upon release of the thumb-piece after the formation of a knot. Depression of the thumb-piece, moreover, causes the limb 8a to swing forward and, by co-operation with the helical formation 7a effect rotation of the tying bill 6 to the extent of a little over a complete revolution in an anti-clockwise direction (as viewed in Figure 5).

As shown more clearly in Figures 9–18, the tying bill 6 comprises a stout relatively stationary tying blade 14 at one side, a similarly stationary resilient element 15 at the other side and a thin pivoted blade 16 which is interposed between the two and mounted to turn about a pivot pin 17. The knot-tying portion of the complete bill 6 extends substantially at right angles to the axis of rotation of the carrier member 7 and, in accordance with usual practice, is slightly curved longitudinally. As will be appreciated, the blade 14 and the element 15 are stationary only in relation to the intermediate pivoted blade 16; all three parts of the bill rotate together. The shank 16a of the pivoted blade 16 is widened and formed with suitably contoured peripheral edges which are arranged to be acted upon by the rim of a circular opening 18 formed in the front wall 5b of the bridge 5 and through which the bill extends. The opening 18 is disposed eccentrically with respect to this axis of rotation of the bill. Thus, as the bill 6 turns through a revolution, the peripheral edges of the shank 16a are acted upon by the apertured portion of the bridge to operate the pivoted blade 16 and thereby cause the bill first to open to receive the appropriate one of two yarns to be tied together and then to close onto this yarn during the formation of a knot.

In the particular example now being described, the inner face 14a (Figure 17) of the tying blade 14 is serrated or otherwise suitably roughened, and the front edge 15a of the element 15, besides being recessed at a location 15b adjoining its free extremity, is sharpened to provide a cutting edge. The inner or rear edge 16b of the intermediate, i. e. pivoted, blade 16 is straight and sharpened for co-operation with the cutting edge 15a—scissor fashion. It is, however, to be clearly understood that as the blade 16 turns to close the bill and retain an additionally drawn loop of the appropriate yarn in the manner to be hereinafter described, a space s (Figures 13, 15 and 16) is left between the sharpened edges 15a and 16b so that the loop is not cut at this stage. The space s is provided by virtue of the presence of the recess 15b formed in the element 15. Accordingly, it is necessary to impart to the pivoted blade 16 a further slight turning movement in the direction of the closure of the bill to sweep the cutting edge 16b past the sharpened edge 15a, before the additionally drawn loop can be cut. But as will be more fully explained later, severance of this loop is delayed until the formed knot has been stripped from the bill 6. This constitutes a distinguishing feature of the present invention.

The front portion 2a of the left-hand side plate 2 is laterally offset outwardly and is recessed at 2b (Figure 7) to receive the ends of the two yarns to be tied together. The recess 2b is normally divided into two to separate and keep apart the yarn ends, initially, by means of an outstanding formation 19a provided on a pivoted yarn-gripping and positioning element 19. This element is mounted to fulcrum on a pin 20 at the inner side of the side-plate 2 and is itself furnished at 21 with an inwardly directed pin which is engaged in a hole formed in the leading end of a companion yarn-gripping and positioning member 22. The member 22 is arranged for longitudinal sliding movement close to and on the outside of the side-plate 2, the leading and operative end of said member extending through an aperture formed in the laterally offset portion of the plate.

The opposite side-plate 3 is similarly offset laterally and has formed therein two side-by-side vertical slots 23 and 24 (Figures 4 and 6) to receive yarn ends to be tied together. Secured to the outside of the plate 3 is a yarn guide 25 of conventional form. For simplicity in illustration, only the lower portion of this guide is indicated in Figure 7, although for the purpose of guiding yarn ends into the slots at opposite sides of the knotter the said guide extends above and across the latter in the form of an arch as will be apparent from Figure 4. Extending through an aperture in the offset portion of the side-plate 3 is the leading and operative portion 26a of a longitudinally displaceable yarn-gripping and positioning member 26. A companion yarn-gripping and positioning element 27, pivoted at 28 upon the inside of the plate 3, is articulated to the member 26 at 29.

In accordance with customary practice, the two longitudinally slidable yarn-gripping and positioning members 22 and 26 are rigidly connected by a transverse pin 30 which extends right across the knotter and is movable along straight slots, such as that indicated at 31 in Figures 4 and 6, formed in the side-plates 2 and 3. For moving forward the two members 22 and 26 simultaneously during the first stage of a knot-typing operation, the transverse pin 30 is normally engaged in an inclined open-ended slot 32 formed in a sectorally-shaped side portion 8c of the actuating member 8. Thus, whenever the thumb-piece 8b is depressed, the rear side of the slot 32 acts on the pin 30 to push forward the members 22 and 26 and, after this pin has left the said slot, the upper curved edge of the sectorally-shaped side portion 8c passes and engages beneath the pin to lock it in its forward position.

The knot-stripper and tightener is indicated at 33 and, as will be seen, is fashioned from a single piece of appropriately shaped and bent metal. The leading operative end of the stripper and tightener 33 is upwardly curved at 33a and has formed therein a notch 33b adapted to receive the appropriate one of two yarns extending from the knot on the tying bill 6 to the side-plate 2 preparatory to tightening of the knot and stripping of the same from the said bill. From its notched leading end, the stripper extends first rearwardly, then upwardly and forwardly again in a curve to the point 33c where it is bent laterally to provide a bridge extending across the knotter practically from one side thereof to the other. At the right-hand side of the knotter (viewing it from the front as in Figure 5), the stripper 33 has a downwardly extending and rearwardly curved portion 33d, which immediately adjoins the transverse bridge 33c, and also a rearwardly directed tail 33e. The stripper is mounted for swinging movement about a fulcrum pin 34 secured at its opposite ends in the side-plates 2 and 3. For co-operation with the depending curved portion 33d of the stripper there is provided on the back of the sectorally-shaped side portion 8c of the actuating member 8 upwardly directed formation 8d. This formation constitutes one of the limbs of the forked rear part of the said actuating member. When the thumb-piece 8b is depressed, the upstanding formation 8d moves forwardly at first idly beneath the tail 33e until the tying bill 6 has been rotated through about three-quarters of a revolution; at this point the formation 8d presses on and co-operates with the portion 33d suchwise as to cause the stripper 33 to swing up from its inoperative position (Figure 4) to its fully operative position shown in Figure 6 where it functions to tighten a formed knot and strip it from the bill. The upper edge of the tail 33e is so disposed as to enable it to make contact with an abutment 35 and so check the upward swing of the tail whenever the actuating member 8 is released at the termination of a knot-forming operation.

Referring to Figure 5 it will be seen that the operative end of the stripper 33 is extended laterally at 36, this extension being turned up at right angles to provide a support 36a for a common side scissor device 37 timed to cut both yarns after the formed knot has been stripped from the bill 6. The scissor device comprises a relatively fixed cutting blade 37a of triangular form which is attached by a lug 37b to the lateral extension 36, and a movable beak-shaped shear blade 37c which is pivoted at 38, between the support 36a and the blade 37a. To enable it to be operated, by being swung down into co-operative relationship with respect to the blade 37a, the shear blade 37c is formed with a tail 37d which has a pin-and-slot connection 39, 40 with an arm 41 mounted at its inner end upon the fulcrum pin 34 about which the stripper is arranged to turn. At its lower edge, the arm 41 is provided with a lateral projection 41a which extends outwardly through an arcuate slot 42 formed in the side plate 3. The arm 41, moreover, is normally coupled to the stripper, resiliently or frictionally, so that although it will move together with the stripper when permitted to do so, the stripper can move relatively to the said arm when upward movement of the latter is arrested by virtue of the projection 41a coming into contact with the upper end of the slot 42. The construction and operation are therefore such that until the stripper 33 has been swung up sufficiently far to strip a formed knot from the bill 6, the arm 41 moves together with the stripper, thereby enabling the scissor device 37 to remain inoperative in its open condition shown in Figure 4. At this stage, however, any further upward movement of the arm 41 is positively prevented by contact of the projection 41a with the upper end of the slot 42, so that continued movement of the stripper (which carries the scissor device) causes the now stationary pin 39 to co-operate with the slot 40 in such a manner as to swing down the pivoted shear blade 37c.

The hereinbefore mentioned final phase of closure of the pivoted blade 16 of the tying bill, delayed until after the stripped knot has been tightened by the stripper 33, is effected in this example by means of a presser element 43 which is mounted to pivot freely about a transverse pin 44 carried by the side-plate 2. The lower operative edge 43a of this presser element is located immediately above the inner portion of the bill for action upon the upwardly presented edge of the widened shank 16a of the pivoted blade 16 at the termination of a knot-producing operation for the purpose of cutting the aforementioned additionally drawn loop. At its left-hand side, the presser element 43 (which is U-shaped in plan) is extended rearwardly at 43b and formed with a nose 43d arranged to be acted upon by the tip of a pointed formation 33f formed on the left-hand side of the stripper adjoining the bridge 33c. Thus, after the knot has been stripped and tightened, a final minute upward movement of the stripper causes the tip of the formation 33f to press upwardly on the nose 43d and so cause the edge 43a of the presser element 43 to press down upon the edge of the blade shank 16a presented thereto.

Figure 9:
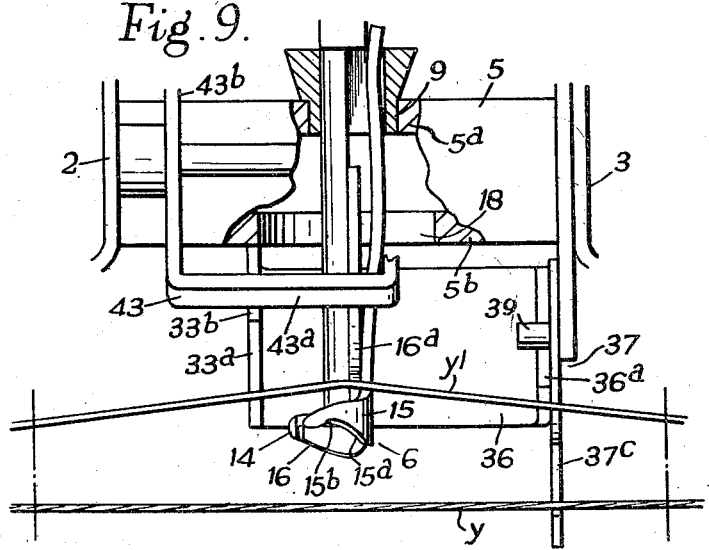

The various stages in tying together the ends of two yarns y and y' into a knot like that depicted in Figure 3 on the knotter just described will now be described with reference to Figures 7–18. First, the two yarn ends are laid across the knotter and supported in the divided recess 2b at one side and in the two slots 23 and 24 at the other side, with the yarn y extending at the back, and the yarn y' at the front, of the bill as shown in Figures 7 and 9. At this stage the operative portion of the bill is in the eleven o'clock position depicted more clearly in Figure 5. The thumb-piece 8b is now depressed. During the initial phase of the operative stroke of the actuating member 8, the yarn gripping and positioning elements 19 and 22 at one side, and the similar elements 26 and 27 at the opposite side, of the knotter move in opposite directions and, in gripping and holding the yarns y and y', reverse the positions thereof so that they become crossed at the points p and p' at respectively opposite sides of the bill 6 (see Figure 10). Meanwhile, the tying bill, still closed, has been turned anti-clockwise to about the nine o'clock position. Next, the closed bill passes downwardly between the reversed portions of the two yarns at the left-hand side of the crossing point p and upwards again to about the three o'clock position at which stage the bill 6 opens, by an appropriate pivotal movement of the blade 16, and receives a straight portion of the yarn y extending to the right of the crossing point p'. As a consequence of this half revolution of the bill, a loop or bight b (Figure 11) of the yarn y' is formed and a loop a of the yarn y is in the initial stage of its formation. As the bill 6 continues to turn and approaches the twelve o'clock position, it closes onto the yarn y, by a reverse pivotal movement of the blade 16. By this time a closed loop a of the yarn y, interengaged with the loop or bight b of the yarn y', has been formed on the bill; also, as a consequence of closure of the bill, an additional loop e of the yarn y has been drawn through the loop or bight b to complete the formation of the knot. As shown in Figures 15 and 16, the additional loop e is formed by virtue of the blade 16 engaging the yarn y and forcing it between the said blade and trapping face 14a of the adjacent blade 14. But since at this stage there is still a space s between the cutting edges 15a and 16b, one limb of the loop e extends through the space and the said loop is not cut. The upwardly moving stripper 33 then acts on the yarns y and y', the former resting in the bottom of the notch 33b and the latter upon the top edge of the operative end of the stripper. As a consequence, the formed knot is pushed off the end of the tying bill, whereupon the shear blade 37c closes so that both yarn ends are cut and thereby trimmed in the scissor device 37 to form the short extremities c and d. Continuing upward movement of the stripper 33 finally tightens the knot, and immediately thereafter the presser element 43 acts on the blade 16 and forces it still further between the blade 14 and the element 15. The result, which is the cutting of the additional loop e to produce the two further free extremities f and g of yarn, is clearly depicted in Figures 14, 17 and 18. This completes the cycle, and upon release of the thumb-piece 8b, all of the parts of the knotter are restored to their original inoperative positions under spring action and the tied yarns are released.

If it is not desired to cut the additional loop e, the knotter is not furnished with the presser element 43, and no cutting edges are formed on the element 15 and the pivoted blade 16 of the bill. Moreover, in this case there is no necessity to recess the element 15. This modified form of the improved knotter is illustrated in Figure 19.

It is to be clearly understood that wherever, in the foregoing description and in the appended claims two yarns are referred to, e. g. the yarns y and y', these will not usually be two separate yarns but rather two ends of the same yarn. Two separate and even different yarns may, however, be tied together in the manner herein described.

I claim:

1. A weaver's knotter comprising, in combination, two spaced side plates formed to receive two yarn ends laid across the knotter, an apertured part connecting said side plates, yarn-positioning means adjacent to each side plate for crossing the ends of yarns to be tied into a knot, an actuating member movably mounted on at least one of said side plates, means operatively connecting said actuating member and said yarn-positioning means, a typing bill rotatably mounted on and between said side plates and rotatable in the aperture of said connecting part, said actuating member comprising means for rotating the bill, said rotary bill comprising a pivoted element and relatively stationary elements, the said pivoted element being acted upon by a portion of the connecting part whereby, as the bill rotates to engage crossed yarn ends and form the same into a knot, the pivoted element is moved to draw one of the yarn ends into an additional loop which is incorporated in the knot, a stripper stripping the knot from the bill and tightening it, said stripper being in contact with and moved by said actuating member, a scissor device carried by said stripper, and means associated with said stripper operative on movement of the stripper actuating said scissor device to cut both yarn ends.

2. Apparatus as claimed in claim 1 wherein the pivoted element and one of the said stationary elements of the rotary bill have cooperating sharpened cutting edges, said stationary element further being recessed on its cutting edge adjacent its free extremity, said apparatus further comprising presser means associated with said stripper actuating said pivoted element to cut the additional loop of the knot.

3. A weaver's knotter comprising, in combination, two spaced side plates respectively recessed and slotted to receive and support two yarn ends laid across the knotter, a transverse bridge connecting said side plates and having therein an aperture, yarn-gripping and positioning means adjacent to each side plate for crossing the ends of yarn to be tied into a knot, an actuating member movably mounted on at least one of said side plates, means operatively connecting said actuating member and said yarn-gripping and positioning means, a tying bill rotatably mounted on and between said side plates and rotatable in the aperture of said transverse bridge, said actuating member comprising means for rotating the bill, said rotary bill comprising a pivoted blade interposed between two relatively stationary elements, the pivoted blade having a shank cooperable with the apertured portion of the transverse bridge whereby as the bill rotates to engage crossed yarn ends and form the same into a knot the pivoted blade is moved to draw one of the yarn ends into an additional loop which is engaged in the knot, a transverse pin extending between the spaced side plates, a stripper pivotally mounted on said transverse pin and comprising means in contact with said actuating member such that the stripper strips the knot from the bill and tightens it, said stripper further comprising a lateral extension adjacent to its operative end, a scissor device mounted on said lateral extension comprising a cutting blade and a pivoted sheer blade, an arm connected to said pivoted sheer blade and movably mounted on said transverse pin, and means associated with said stripper operative on movement of the stripper for actuating said arm and pivoted blade to cut both of the yarn ends.

4. Apparatus as claimed in claim 3 wherein the pivoted element and one of the said stationary elements of the rotary bill have cooperating sharpened cutting edges, said stationary element further being recessed on its cutting edge, adjacent its free extremity, said apparatus further comprising a presser means associated with said stripper actuating said pivoted element to cut the additional loop of the knot.

References Cited in the file of this patent
UNITED STATES PATENTS

| | | |
|---|---|---|
| 2,125,423 | Bromley et al. | Aug. 2, 1938 |
| 2,678,229 | Shortland | May 11, 1954 |